United States Statutory Invention Registration [19]

[11] Reg. Number: H421

Glommen [43] Published: Feb. 2, 1988

[54] TOW BAR STEP

[76] Inventor: Martin E. Glommen, 782 N. 825 West, Clearfield, Utah 84015

[21] Appl. No.: 848,097

[22] Filed: Apr. 4, 1986

[51] Int. Cl.[4] ..... B60R 3/00
[52] U.S. Cl. ..... 280/169; 180/904
[58] Field of Search ..... 280/163, 164 R, 164 A, 280/169, 481, 493; 180/904; D25/69; D12/203; 52/179, 180

[56] References Cited

U.S. PATENT DOCUMENTS

| | | | |
|---|---|---|---|
| D. 213,043 | 12/1968 | Crepeau | D25/69 |
| 2,624,595 | 1/1953 | Horn et al. | 280/164 |
| 2,732,088 | 1/1956 | Arnot | 415/428 |
| 3,640,035 | 2/1972 | Butterfield | D25/69 X |
| 3,730,556 | 5/1973 | Aldape et al. | 280/164 R X |
| 3,740,072 | 6/1973 | Veith | 280/164 A |
| 3,779,580 | 12/1973 | Thelen | 280/164 R |
| 4,180,282 | 12/1979 | Henning | 280/481 |
| 4,257,620 | 3/1981 | Okland | 280/164 R X |
| 4,289,819 | 9/1981 | Kalman | 280/169 X |

*Primary Examiner*—Deborah L. Kyle
*Assistant Examiner*—Michael J. Carone
*Attorney, Agent, or Firm*—Donald J. Singer; Bobby D. Scearce

[57] ABSTRACT

A nonskid step removably attachable to a tow bar of a tow vehicle used for maneuvering aircraft and associated ground support vehicles in ground handling operations related to the aircraft is described which comprises a platform having a nonskid surface, a saddle shaped support and a flange attached near opposite ends of the platform by which the step is removably attached to the tow bar and the nonskid surface is held in spaced relationship to the tow bar and level to the ground when the tow bar is operatively attached to a towing vehicle.

2 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

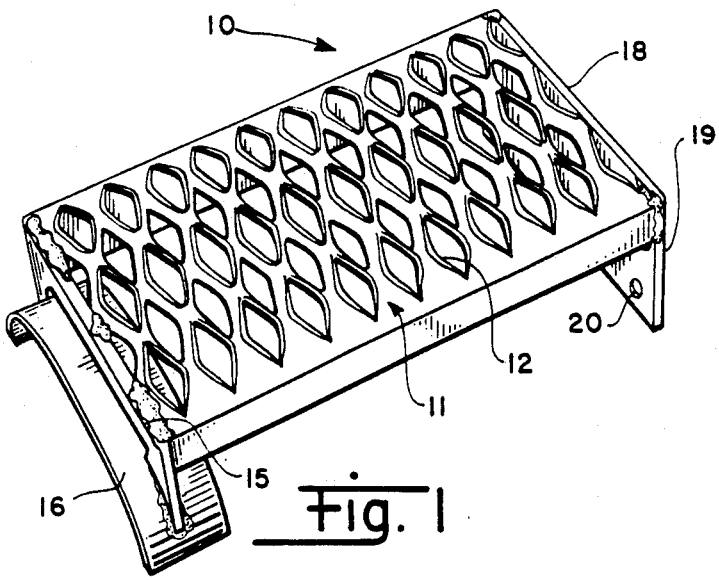
Fig. 1
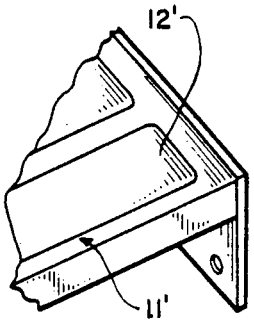
Fig. 2
Fig. 3
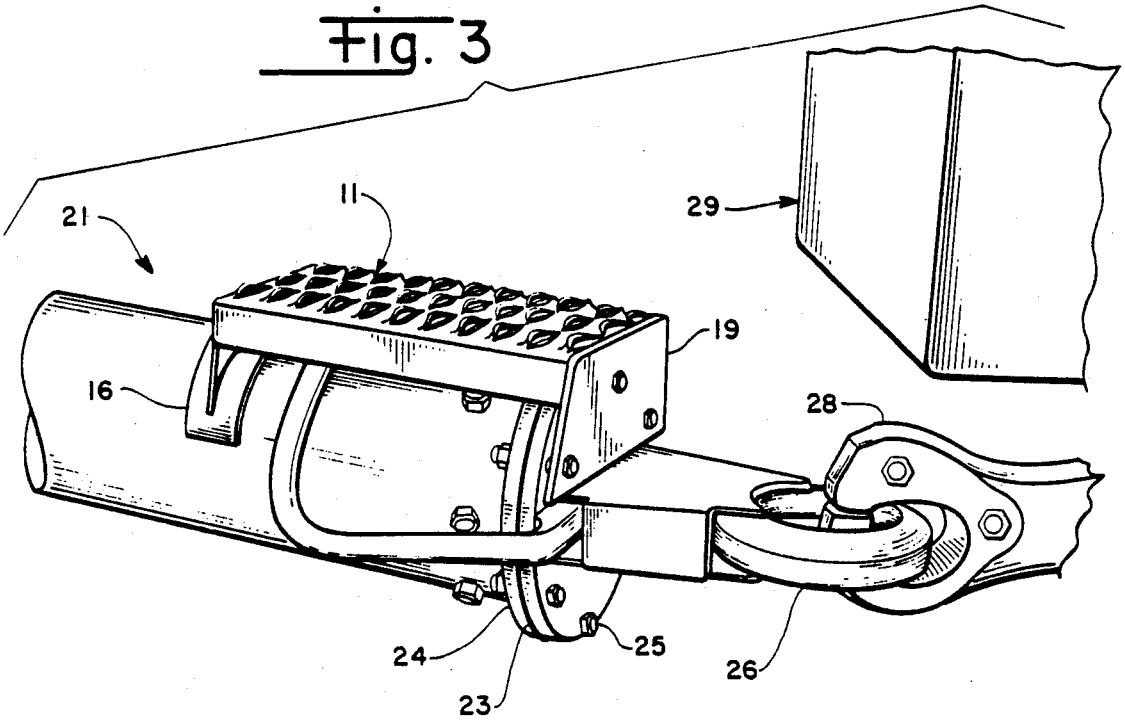

TOW BAR STEP

RIGHTS OF THE GOVERNMENT

The invention described herein may be manufactured and used by or for the Government of the United States for all governmental purposes without the payment of any royalty.

BACKGROUND OF THE INVENTION

The present invention relates generally to vehicles and related equipment for towing and maneuvering aircraft and wheeled maintenance and support equipment in ground handling operations related thereto, and more particularly to a novel step structure removably attachable to the tow bar of such vehicles to facilitate the safe mounting and dismounting of the vehicles.

In the performance of ground support operations for aircraft, the towing or other maneuvering of aircraft and related support and maintenance equipment requires the use of small tractors or tow motors having towing means including a tow bar attachable to the aircraft or support vehicle. Tractors configured for the functions as just stated may carry three to four maintenance persons for performing the functions. The persons mounting or dismounting the tractor often use the tow bar or hitch as a step, which presents a substantial slipping hazard since the tow bar or hitch may be wet or icy, or the footwear of the maintenance persons may be greasy. Existing tow bar structures include no feature to allow the safe use thereof as a step to alleviate the slipping hazard.

The invention provides a step removably attachable to the tow bar of a tractor or other towing vehicle, for substantially eliminating the slipping hazard associated with use of a tow bar as a step in mounting or dismounting the tractor, and includes a generally rectangularly shaped platform having a nonskid surface, and a saddle welded near one end and a flange near the other end thereof for securely holding the platform in spaced relationship to the tow bar, the flange including means for bolting the step to the tow bar near the hitch end thereof.

It is a principal object of the invention to provide an improved tow bar for use with a tractor, tow motor or the like.

It is a further object of the invention to provide a step attachable to a tow bar to obviate the slipping hazard associated with using the tow bar as a step.

These and other objects of the invention will become apparent as the detailed description of representative embodiments thereof proceeds.

SUMMARY OF THE INVENTION

In accordance with the foregoing principles and objects of the invention, a nonskid step removably attachable to a tow bar of a tow vehicle used for maneuvering aircraft and associated ground support equipment in ground handling operations related to the aircraft is described which comprises a platform having a nonskid surface, a saddle shaped support and a flange attached near opposite ends of the platform by which the step is removably attachable to the tow bar and the nonskid surface is held in spaced relationship to the tow bar and level to the ground when the tow bar is operatively attached to a towing vehicle.

DESCRIPTION OF THE DRAWINGS

The invention will be more clearly understood from the following detailed description of representative embodiments thereof read in conjunction with the accompanying drawings wherein:

FIG. 1 is a perspective view of a representative embodiment of the step of the invention;

FIG. 2 is a fragmentary perspective view of a second embodiment illustrating an alternative nonskid surface for the step; and FIG. 3 is a perspective view of the step of FIG. 1 installed on a tow bar.

DETAILED DESCRIPTION

Referring now to FIG. 1, shown therein is a perspective view of a representative tow bar step of the invention. Step 10 comprises platform 11 of expanded metal 12, metal plate having a dimpled surface, or other structural material providing or supporting a substantially nonskid surface. FIG. 2 is a fragmentary perspective view of a second embodiment illustrating an alternative nonskid surface wherein platform 11' comprising metal plate has one or more nonskid treads 12' attached thereto. Expanded metal 12 structure for platform 11 is preferably to other suitable structures, since the open structure characterizing expanded metal 12 allows passage of water, snow, ice, mud, grease, oil, and other potentially hazardous substances while providing a nonskid surface.

Near one end 15 of platform 11 is attached by welding or other suitable means a support in the form of a saddle 16 for holding one end of platform 11 in spaced relationship to a tow bar to which step 10 is attached as hereinbelow detailed. Saddle 16 is configured to conform to a round, rectangular or other cross sectional shape as might characterize the tow bar. One or more additional saddles 16 may be welded to platform 11 intermediate the ends thereof depending on the weight bearing requirements on step 10. Near a second end 18 opposite end 15 is attached a flange 19 including means in the form of a plurality of suitably located bolt holes 20 by which step 10 may be attached to a tow bar as described below.

Referring now to FIG. 3, shown therein is a perspective view of step 10 of the FIG. 1 embodiment attached to a tow bar 21. Tow bar 21 may ordinarily have the generally cylindrical shape shown in FIG. 3, which shape controls the size and shape of saddle 16. Tow bar 21 ordinarily terminates in a flange 23 and ring 24 assembly held by bolts 25, to which assembly is attached a hitch 26 for releasable attachment to the hitch mechanism 28 of tractor 29. The number and location of bolt holes 20 in flange 19 are selected to correspond to the location of bolts 25 in flange 23 and ring 25 so that step 10 may be solidly attached to tow bar 21 utilizing bolts 25. Saddle 16 and flange 19 are sized to support step 10 horizontally (level) and in spaced relationship to tow bar 21 when tow bar 21 is operatively attached to tractor 29 as suggested in FIG. 3.

The size and material selection for step 10 is not considered limiting of the invention, although step 10 must provide adequate support strength and stepping area for the intended purpose. A unit built in demostration of the invention comprised a platform 11 about 7×12 inches of serrated safety plank grating of 14 gauge galvanized steel; flange 19 and saddle 16 comprised ¼ inch cold rolled steel shaped to conform to a cylindrical tow bar about 6½ inches in diameter.

The invention as described therefore provides a nonskid step for use in combination with a tow bar. The step is easily installed and removed from the tow bar, substantially eliminates the hazard associated with using the tow bar as a step in mounting a tractor attached thereto, and is virtually maintenance free.

It is understood that certain modifications to the invention as described may be made, as might occur to one with skill in the field of the invention within the scope of the appended claims. Therefore, all embodiments contemplated hereunder which achieve the objects of the invention have not been shown in complete detail. Other embodiments may be developed without departing from the spirit of the invention or from the scope of the appended claims.

I claim:

1. In a tow bar for a tow vehicle, said tow bar having a hitch at one end thereof for releasable attachment to a towing vehicle and an operable position wherein said tow bar is substantially level as attached to said towing vehicle, an improvement comprising a nonskid step removably attachable to said tow bar at said one end thereof, said step including:

(a) a platform comprising expanded metal presenting a plurality of edges defining a generally flat, substantially nonskid surface:

(b) a support attached at a first end of said platform for holding a corresponding first end of said nonskid surface in spaced relationship to said tow bar, said support having shape conforming substantially to the shape of said tow bar;

(c) a flange attached near a second end of said platform opposite said first end for holding a corresponding second end of said nonskid surface in spaced relationship to said tow bar, said flange including means for removably attaching said step to said tow bar at said one end thereof near said hitch; and (d) said support and flange sized to hold said nonskid surface substantially level when said tow bar is in said operable position.

2. In a tow bar for a tow vehicle, said tow bar having a hitch at one end thereof for releasable attachment to a towing vehicle and an operable position wherein said tow bar is substantially level as attached to said towing vehicle, an improvement comprising a nonskid step removably attachable to said tow bar at said one end thereof, said step including:

(a) a platform comprising a metal plate, presenting a generally flat, substantially nonskid surface and at least one nonskid tread attached to said platform defining said nonskid surface;

(b) a support attached at a first end of said platform for holding a corresponding first end of said nonskid surface in spaced relationship to said tow bar, said support having shape conforming substantially to the shape of said tow bar;

(c) a flange attached near a second end of said platform opposite said first end for holding a corresponding second end of said nonskid surface in spaced relationship to said tow bar, said flange including means for removably attaching said step to said tow bar at said one end thereof near said hitch; and (d) said support and flange sized to hold said nonskid surface substantially level when said tow bar is in said operable position.

* * * * *